(12) United States Patent
Itaya et al.

(10) Patent No.: US 9,376,982 B2
(45) Date of Patent: Jun. 28, 2016

(54) CONTROL APPARATUS FOR FUEL INJECTOR

(75) Inventors: Takaki Itaya, Hitachinaka (JP); Hirotaka Nakai, Hitachinaka (JP); Masahiro Soma, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 162 days.

(21) Appl. No.: 14/236,718

(22) PCT Filed: Jul. 20, 2012

(86) PCT No.: PCT/JP2012/068475
§ 371 (c)(1),
(2), (4) Date: Feb. 3, 2014

(87) PCT Pub. No.: WO2013/031422
PCT Pub. Date: Mar. 7, 2013

(65) Prior Publication Data
US 2014/0240886 A1    Aug. 28, 2014

(30) Foreign Application Priority Data

Aug. 31, 2011 (JP) ................................. 2011-188159

(51) Int. Cl.
*F02D 41/30* (2006.01)
*F02D 41/40* (2006.01)
(Continued)

(52) U.S. Cl.
CPC ................ *F02D 41/40* (2013.01); *F02D 41/20* (2013.01); *F02D 41/402* (2013.01);
(Continued)

(58) Field of Classification Search
CPC ..... F02D 41/40; F02D 41/401; F02D 41/402; F02D 41/405; F02D 2200/06; F02D 2200/0602; F02D 2200/0604; F02D 41/20; F02D 2041/2027; F02D 2041/2034; F02D 2041/2037
USPC ................. 123/490, 493, 472, 445, 299, 304; 701/101, 102, 103, 104, 105
See application file for complete search history.

(56) References Cited

U.S. PATENT DOCUMENTS 5,839,412 A * 11/1998 Stockner ................. F02D 41/20
123/446
5,975,053 A    11/1999 Rodier
(Continued)

FOREIGN PATENT DOCUMENTS

JP    61-76713 A    4/1986
JP    4-153542 A    5/1992
(Continued)

OTHER PUBLICATIONS

International Search Report with English translation dated Aug. 14, 2012 (5 pages).

*Primary Examiner* — Hai Huynh
*Assistant Examiner* — Raza Najmuddin
(74) *Attorney, Agent, or Firm* — Crowell & Moring LLP (57) ABSTRACT

In consideration of a force acting on a valve, wear in the valve or in a valve seat is suppressed and thereby the frequency of lifetime use of a fuel injector is increased. In a control apparatus for controlling a driving current that is allowed to pass to a fuel injector including a solenoid, after a first injection pulse width for injecting fuel is finished and before a second injection pulse width, which is to be output subsequently to the first injection pulse width for injecting the fuel, is started, a third pulse width 421 for allowing the driving current to pass through the solenoid is output and the driving current that is to be allowed to flow through the solenoid by the third pulse 421 is controlled in accordance with one of a measurement value and a predictive value of a fuel pressure.

17 Claims, 8 Drawing Sheets

(51) Int. Cl.
  *F02D 41/20* (2006.01)
  *F16K 31/06* (2006.01)
  *F02M 51/00* (2006.01)

(52) U.S. Cl.
  CPC .... *F16K 31/0675* (2013.01); *F02D 2041/2024* (2013.01); *F02D 2041/2034* (2013.01); *F02D 2041/2058* (2013.01); *F02D 2200/0602* (2013.01); *F02M 51/00* (2013.01); *Y02T 10/44* (2013.01)

(56) References Cited

U.S. PATENT DOCUMENTS

7,013,876 B1  3/2006  Puckett et al.
2009/0288640 A1  11/2009  Shingu et al.
2012/0216783 A1*  8/2012  Kusakabe ............... F02D 41/20 123/490
2013/0139791 A1*  6/2013  Kusakabe ............... F02D 41/20 123/478

FOREIGN PATENT DOCUMENTS

| | | |
|---|---|---|
| JP | 2000-205076 A | 7/2000 |
| JP | 2001-510528 A | 7/2001 |
| JP | 2003-120848 A | 4/2003 |
| JP | 2005-139971 A | 6/2005 |
| JP | 2008-534855 A | 8/2008 |
| JP | 2009-281291 A | 12/2009 |
| WO | WO 99/27250 A1 | 6/1999 |
| WO | WO 2006/107432 A1 | 10/2006 |

* cited by examiner

CONTROL APPARATUS FOR FUEL INJECTOR

TECHNICAL FIELD

The present invention relates to a fuel injection control apparatus for an internal combustion engine, and particularly to control on an operation of a valve of a fuel injector.

BACKGROUND ART

As a method for reducing an impact power by a valve exerted on a valve seat when the valve is seated on the valve seat, a method for slowing down a moving speed (a valve closing speed) of the valve by providing reduced re-energization of a solenoid during the travel of the valve to the closing side after energization of the solenoid is finished is known (see, for example, PTL 1).

A technique to prevent overconsumption of electric power and a technique to control re-energization of a solenoid in response to different operating states in order to retain the valve closing speed appropriately are also known (see PTL 2, PTL 3, and PTL 4). In these techniques, reducing the maximum value of the re-energization performed for slowing down the valve closing speed at idle to less than that for the normal operation is proposed.

CITATION LIST

Patent Literatures

PTL 1: Japanese Patent Application Laid-Open No. 2003-120848
PTL 2: Japanese Patent Application Laid-Open No. 2001-510528
PTL 3: Japanese Patent Application Laid-Open No. 2000-205076
PTL 4: Japanese Patent Application Laid-Open No. 4-153542

SUMMARY OF INVENTION

Technical Problem

The latter technique in the prior art controls the re-energization of the solenoid in response to the operating states of an engine. A force applied to a seat portion between a valve and a valve seat when the valve is seated on the valve seat to close the valve is significantly affected by a fuel pressure. Although an engine load is an operating state, the fuel pressure does not necessarily have a proportional relation with the engine load. For example, increasing the fuel pressure can atomize fuel, thereby promoting mixture of fuel and air and achieving a good combustion status. Thus, providing a high fuel pressure may be considered from a viewpoint of the promotion of the mixture of fuel and low emissions, in addition to a viewpoint of an injection quantity corresponding to the engine load.

As described above, the force applied to the seat portion between the valve and the valve seat when the valve is seated does not necessarily depends on the operating states of the engine but largely depends on the fuel pressure, and thus, to reduce wear in the valve or in the valve seat, there is a demand for control of opening and closing the valve in response to the fuel pressure.

It is therefore an object of the present invention to suppress wear in a valve or in a valve seat in consideration of a force acting on the valve or the valve seat and thereby to increase the frequency of lifetime use of a fuel injector.

Solution to Problem

As a solution for achieving the object described above, a control apparatus for a fuel injector according to the invention is a control apparatus for controlling a driving current that is to be allowed to pass to a fuel injector including a solenoid, wherein the control apparatus for the fuel injector is configured to, after a first injection pulse width for injecting fuel is finished and before a second injection pulse width, which is to be output subsequently to the first injection pulse width for injecting the fuel, is started, output a third pulse width for allowing the driving current to pass through the solenoid and control the driving current that is to be allowed to flow through the solenoid by the third pulse in accordance with one of a measurement value and a predictive value of a fuel pressure. In this aspect, the control apparatus for the fuel injector is not limited to one or both of a circuit device generally referred to as an engine control unit (ECU) and a drive circuit configured with or separately from the circuit device for supplying the driving current to the fuel injector.

In the control apparatus for the fuel injector described above, at least one of a maximum value of the driving current that is to be allowed to flow through the solenoid by the third pulse and a presence of the driving current that is to be allowed to flow through the solenoid by the third pulse is controlled in accordance with one of the measurement value and the predictive value of the fuel pressure. In this aspect, the third pulse is generally output to a signal line identical to that for an injection pulse for injecting fuel and thus could be referred to as a third injection pulse width; however, since the third pulse is not for injecting the fuel, it is referred to without the word "injection" herein.

Additionally, a pulse width of the third pulse is changed in accordance with one of the measurement value and the predictive value of the fuel pressure.

Additionally, an applying timing of the driving current that is to be allowed to flow through the solenoid by the third pulse is controlled in accordance with a driving current waveform for valve opening and closing, an engine rpm, and the number of injections in addition to one of the measurement value and the predictive value of the fuel pressure.

Additionally, control is performed such that the third pulse is not output in a first operation area having an increased engine rpm and an increased fuel pressure, so that the driving current that is to be allowed to flow through the solenoid by the third pulse is prevented from flowing.

Additionally, the control is performed such that the third pulse is output in a second operation area having an engine rpm similar to the engine rpm in the first operation area and a fuel pressure smaller than the fuel pressure in the first operation area, so that the driving current is allowed to flow through the solenoid.

Additionally, the control is performed such that the third pulse is not output in a third operation area having an engine rpm similar to the engine rpm in the first operation area and the engine rpm in the second operation area and a fuel pressure further smaller than the fuel pressure in the second operation area, so that the driving current that is to be allowed to flow through the solenoid by the third pulse is prevented from flowing.

Additionally, in a case in which the control is performed for allowing the driving current to pass through the solenoid with the third pulse, a pulse width of the first injection pulse is reduced in comparison with a case in which the control is not performed.

Advantageous Effects of Invention

In the present invention, the valve closing speed of the valve is controlled in accordance with the fuel pressure, enabling the control of the valve closing speed in consideration of the force acting on the valve or the valve seat. This can suppress the wear in the valve or in the valve seat, thereby increasing the frequency of lifetime use of the fuel injector.

DESCRIPTION OF EMBODIMENTS

Some embodiments of the fuel injector according to this invention will now be described in detail with reference to the drawings.

Figure 1:
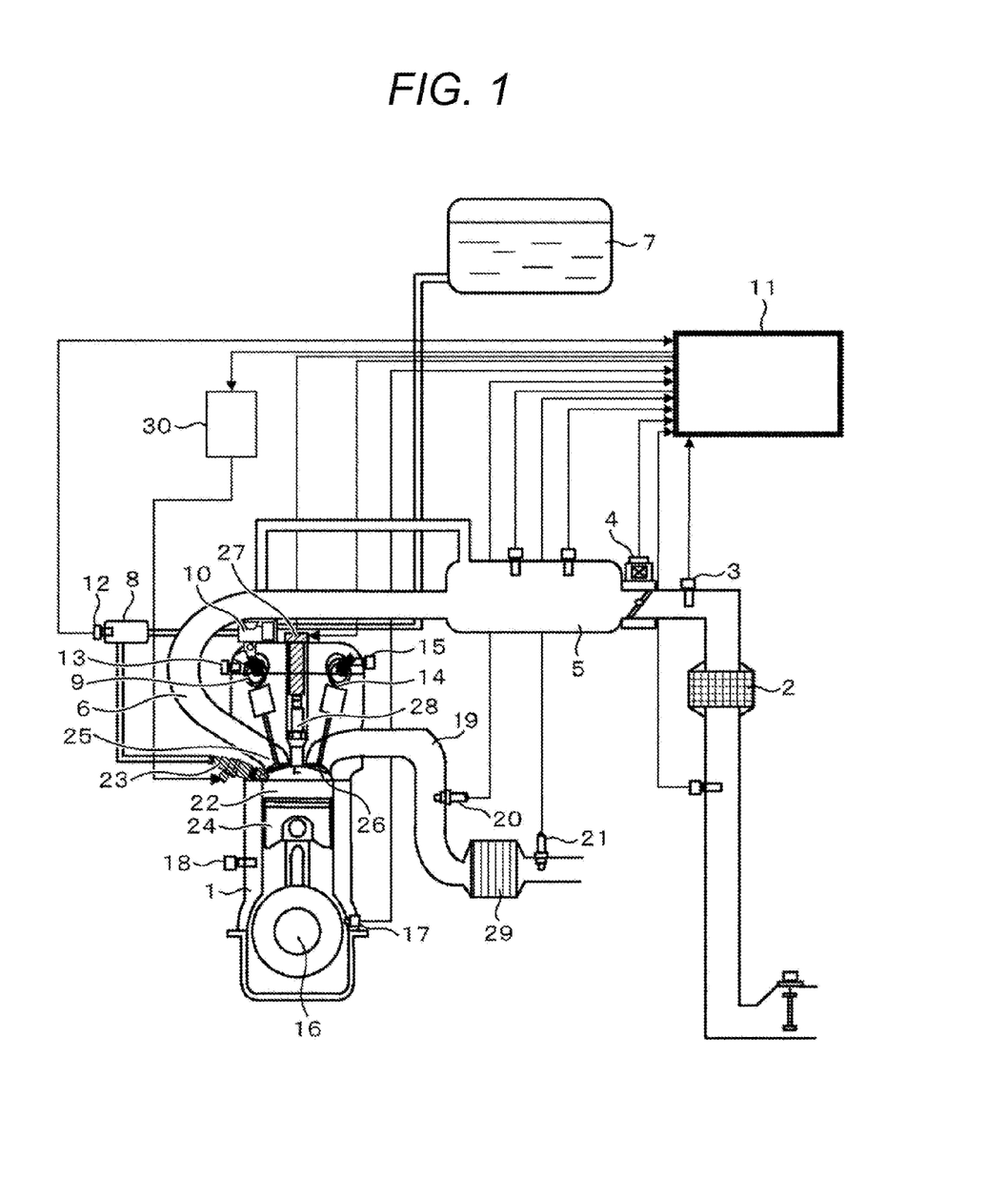
FIG. 1 is a block diagram of an engine system.

FIG. 1 is a diagram of a configuration of an engine system according to the embodiments. Although the embodiments described herein assume an engine including more than one cylinder, one cylinder is illustrated for the convenience of description.

A basic operation of an engine 1 will now be described. As for air to flow into the engine 1, the air passes through an air cleaner 2, and an airflow sensor 3 mounted in an intake air duct measures the amount of air flowing into the engine 1. The amount of air flowing into the engine 1 is controlled by a throttle valve 4. An intake collector 5, which is for distributing air to other cylinders, not shown, distributes the air to air intake pipes for cylinders. The air then flows through an intake valve 25 into a combustion chamber 22. An air flow control valve, not shown, may be used at some midpoint of an air intake pipe 6 to impart directivity to the air flow. As for the passage of fuel, the fuel is discharged and pressurized by a low-pressure fuel pump, not shown, to be delivered from a fuel tank 7 through a fuel line to a common rail 8. The fuel is further pressurized to accumulate pressure by a high-pressure fuel pump 10 mounted on an intake camshaft 9. An engine control unit (hereinafter referred to as ECU) 11 internally determines an operating state of the engine 1 in accordance with signals from various sensors mounted on the engine 1 to output command values suitable for the operating state to various actuators.

Examples of the various sensors include the airflow sensor 3, a fuel pressure sensor 12 set at the common rail 8 for detecting the fuel pressure, a phase sensor 13 for detecting the phase of an intake cam 9, a phase sensor 15 for detecting the phase of an exhaust cam 14, a crank angle sensor 17 for detecting the speed of a crankshaft 16, a coolant temperature sensor 18 for detecting an engine coolant temperature, a knock sensor (not shown) for detecting knocking, and exhaust gas sensors (an exhaust A/F sensor 20 and an exhaust $O_2$ sensor 21) for detecting exhaust gas concentrations in an exhaust pipe 19.

Examples of the various actuators include a fuel injector 23, the high-pressure fuel pump 10, the throttle valve 4, the air flow control valve (not shown), phase control valves (not shown) for controlling cam phases for the intake and the exhaust, and an ignition coil 20.

To describe an operational structure of the engine 1, the ECU 11 receives signals of the amount of air measured by the airflow sensor 3 and from the exhaust A/F sensor 20 and the exhaust $O_2$ sensor 21 to calculate a fuel injection quantity. The fuel pressure sensor 12 detects the pressure of the fuel pressurized by the high-pressure pump 10, so that the ECU 11 decides an injection duration. The ECU 11 sends an injection signal to a drive circuit 30 for the fuel injector, and the drive circuit 30 for the fuel injector outputs a drive signal to the fuel injector 23, so that the fuel is injected. The injection signal mainly includes an injection timing, the number of injections, and the injection duration. The injection signal will be described in the embodiments of a control method according to the invention. Alternatively, the drive circuit 30 may be provided in the ECU 11.

The air and the fuel delivered to the combustion chamber 22 are vaporized and mixed in the combustion chamber 22 as a piston 24 makes an up-and-down motion, so that an air/fuel mixture is formed. A temperature and a pressure are then increased as the piston 24 compresses. The ECU 11 calculates an ignition timing from information, such as an engine rpm and the fuel injection quantity, to output an ignition signal to an ignition coil 27. The ignition signal mainly includes an energization start timing and an energization finish timing of the ignition coil 27. This allows a spark plug 28 to emit a spark at a timing slightly before a compression top dead center of the piston 24, igniting the air/fuel mixture in the combustion chamber 22 to cause combustion. The timing for the ignition, which varies with an operating status, may be after the compression top dead center. The combustion increases the pressure, exerting a force to push back the piston 24 downward to achieve an expansion stroke, in which the force is transmitted to the crankshaft 16 in the form of an engine torque, which turns to an engine power. Once the combustion is finished, a residual gas in the combustion chamber 22 passes through an exhaust valve 26 to be discharged into the exhaust pipe 19. The exhaust gas flows through a catalyst 29 positioned at some midpoint of the exhaust pipe 19 to be discharged into the atmosphere.

A control of the fuel injector 23 in FIG. 1 will be described hereinafter with reference to FIGS. 1, 2, 3, and 4.

A configuration of a fuel injector (the fuel injector 23 in FIG. 1) used in the embodiments herein will now be described with reference to FIG. 2. In a fuel injector 201 illustrated in FIG. 2, a body 202, which includes a core 203, a nozzle holder 204, and a housing 205, guides the fuel from the high-pressure fuel pump 10 illustrated in FIG. 1 through a fuel passageway 206 to a plurality of fuel nozzles 207. A valve 208, which includes an anchor 209 at its top end, is guided by guide members 214 and 215 so as to be able to slide in an axial direction of the valve 208 (in a direction of a central axis of the fuel injector 201) and is accommodated in the nozzle holder 203. Although the valve 208 and the anchor 209 are configured such that relative displacement is allowed in the axial direction of the valve 208 and that the anchor 209 is urged by a spring 216 to an open side in the embodiments herein, the anchor 209 may be fixed to the valve 208. In a case in which the anchor 209 is fixed to the valve 208, the spring 216 is unnecessary.

A spring 210 is positioned between the valve 208 and an adjustor pin 211, with its position at a top end thereof restrained by the adjustor pin 211. The spring 210 presses the valve 208 against a seat portion 213 of a seat member 212 to close the fuel nozzles 207. Upon application of a driving current from the drive circuit 30, a solenoid 214 excites a magnetic circuit including the core 203 and the anchor 209, generating magnetic attraction between the core 203 and the anchor 209 and thereby lifting up the anchor 209 toward the core 203 in the axial direction. This allows the anchor 209 to lift the valve 208 in the axial direction off the seat portion 213 of the valve seat to open the plurality of fuel nozzles 207. This permits the fuel, pressurized and delivered by the high-pressure fuel pump 10 illustrated in FIG. 1, to pass through the fuel passageway 206 and be injected through the fuel nozzles 207.

Figure 3:
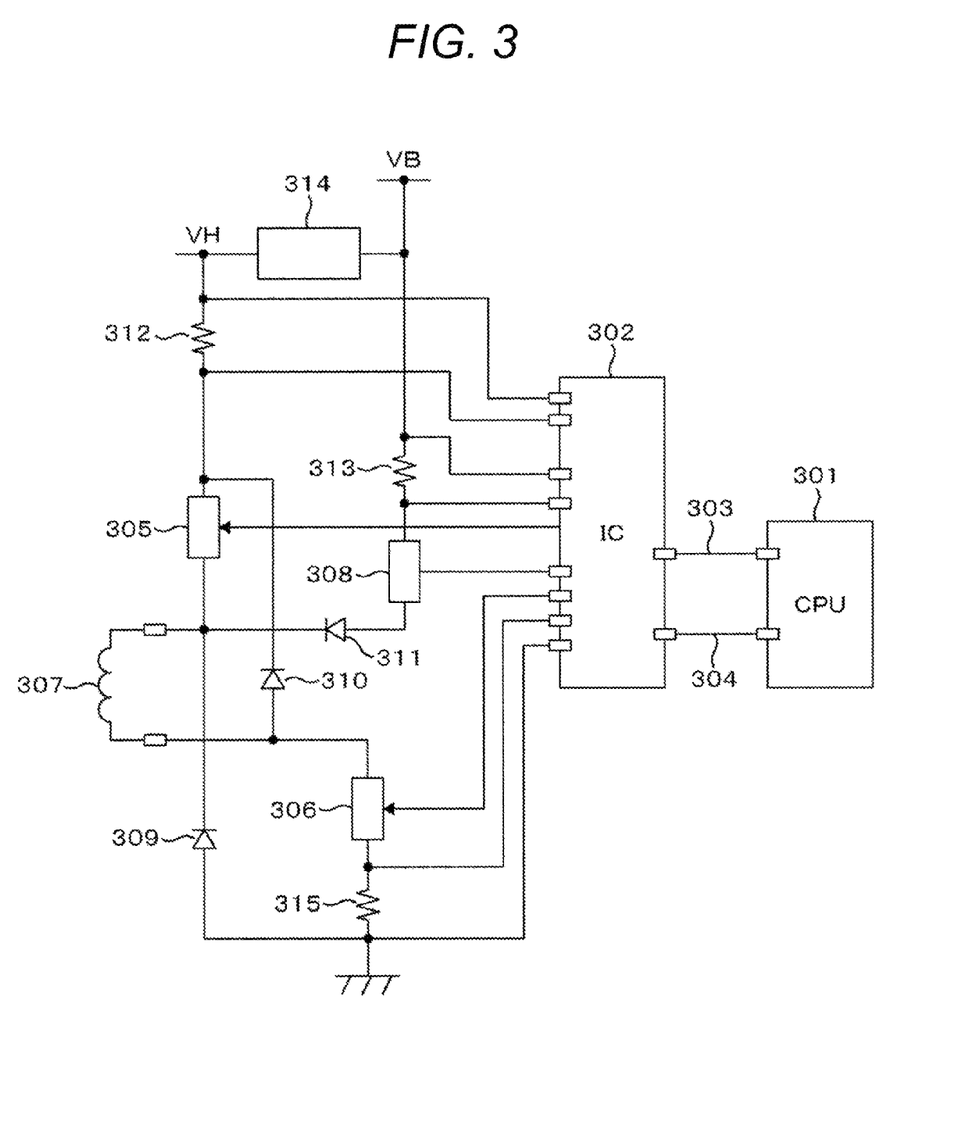
FIG. 3 is a diagram of a circuit configuration for driving the fuel injector.

A configuration of the drive circuit will now be described with reference to FIG. 3. FIG. 3 is a diagram of a circuit configuration for driving the fuel injector 201.

A CPU 301, which is provided, for example, in the ECU 11, computes an injection pulse Ti and the injection timing appropriately in response to an operating condition of the internal combustion engine and outputs the injection pulse Ti in the form of an injection signal through a communication line 304 to a driver IC 302 for the fuel injector 201. The driver IC 302 then turns switching elements 305, 306, and 307 ON and OFF to supply the driving current to the fuel injector 307 (the fuel injector 23 in FIG. 1 and the fuel injector 201 in FIG. 2).

The switching element 305 is connected between a high-voltage source VH, having a higher voltage than a voltage source VB inputting into the drive circuit 30, and a high-voltage terminal of the fuel injector 307. The switching elements are configured with, for example, FETs or transistors. The high-voltage source VH provides, for example, 60 V, which is generated by increasing a battery voltage with a booster circuit 314. The booster circuit is configured with, for example, a DC/DC converter. The switching element 308 is connected between the low-voltage source VB and the high-voltage terminal of the fuel injector 307. The low-voltage source VB provides, for example, the battery voltage, which is 12 V.

The switching element 306 is connected between a low-voltage terminal of the fuel injector 307 and a ground potential. The driver IC 302 uses resistances 315, 312, and 313, which are for detecting current, to detect a current value flowing through the fuel injector 307, and uses the detected current value to turn the switching elements 305, 306, and 308 ON and OFF and thereby generate a desired driving current. Diodes 309 and 310 are provided to shut off the current. The CPU 301, which communicates with the driver C 302 through the communication line 303, can switch the driving current to be generated by the driver IC 302 in a manner dependent on the pressure of the fuel to be supplied to the fuel injector 307 and the operating condition.

Alternatively, a capacitor, not shown, may be connected to the solenoid to allow an excess current value of the solenoid to pass to the capacitor and thereby maintain a constant value. Concerning the discharging of the excess current value, the connection of the capacitor may be excluded if the driving of the valve 208 is not prevented.

Figure 2:
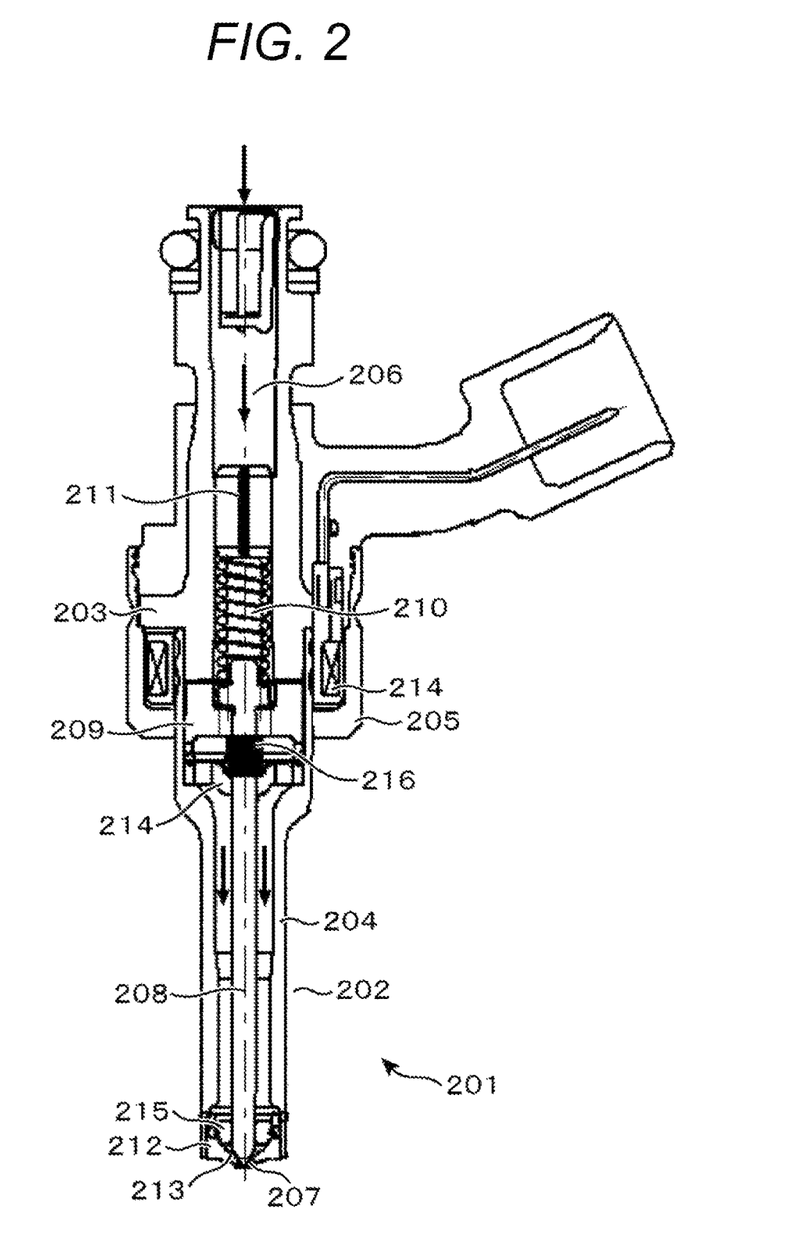
FIG. 2 is a block diagram of a fuel injector.
Figure 4:
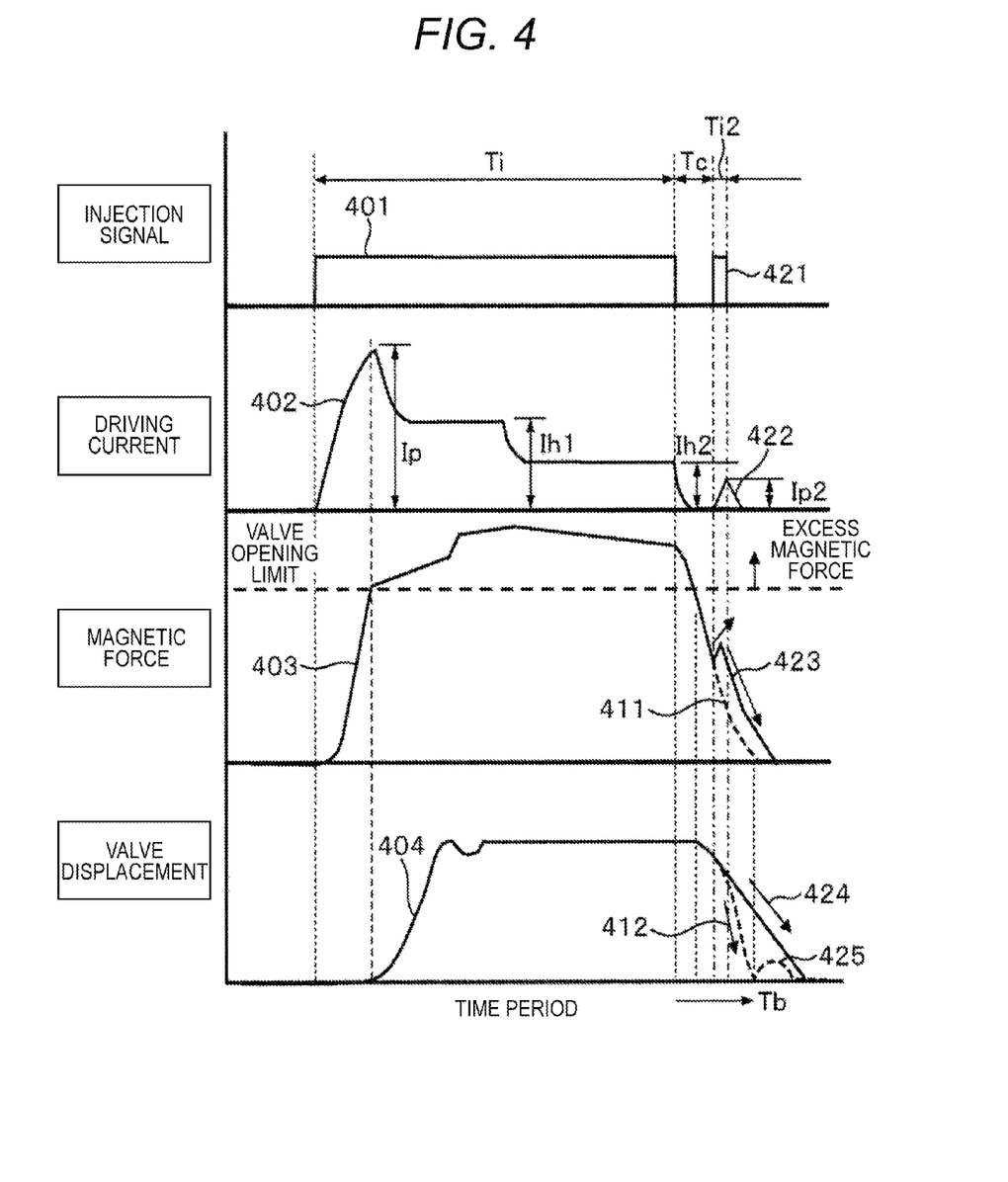
FIG. 4 is a time series graph of an injection signal, a driving current waveform, a magnetic force, and a valve displacement.

FIG. 4 is a diagram, in which, from top, an injection signal 401, a driving current 402, a magnetic force 403 generated by energizing the solenoid 214 of the fuel injector in FIG. 2, and a displacement 404 of the valve of the fuel injector are illustrated in relation to a control signal of the fuel injector (the fuel injector 23 in FIG. 1 and the fuel injector 201 in FIG. 2).

The ECU 11 illustrated in FIG. 1 receives results of detection of the operating status from the various sensors to detect a required injection quantity and decides the injection signal 401 in FIG. 4. A procedure to determine a driving waveform will be described hereinafter with reference to a step diagram in FIG. 6. The ECU 11 illustrated in FIG. 1 outputs the injection signal 401 to allow the drive circuit 30 for the fuel injector to output the driving current 402, so that the solenoid 214 in the fuel injector 201 in FIG. 2 (the fuel injector 23 in FIG. 1) is energized, resulting in the magnetic force 403. This lifts up the valve 208 to inject the fuel. To describe each signal in detail, the injection signal 401 is input into the drive circuit 30, which in turn outputs the driving current waveform 402. The driving current waveform 402 increases the current value until a maximum value Ip of the driving current is reached. This allows the magnetic force 403 to generate a magnetic force significant enough to open the valve 208. This enables the valve 208 to operate with a certain delay from the magnetic force as marked with the valve displacement 404. The driving current 402 then maintains current values Ih1 and Ih2 to maintain the valve opening. This allows the magnetic force 403 to maintain a magnetic force significant enough for the valve opening. Here, in consideration of the solid variability in the valve closing force of the valve 208 and the variability in the magnetic force, the solenoid 214 illustrated in FIG. 2 has a magnetic force in excess of the magnetic force significant enough for the valve opening. Subsequently, as the injection signal 401 finishes, the current value of the driving current waveform 402 also becomes zero. This allows the magnetic force 403 to become zero with a certain delay from the driving current waveform 402. In a case in which no control according to the embodiments is performed, the magnetic force 403 decreases toward zero with a magnetic force marked with reference numeral 411 upon valve closing, and thus the valve displacement 404 changes as illustrated with a valve displacement 412. The valve displacement 412 exhibits rapid valve closing due to a rapid reduction in magnetic force upon the valve closing and a strong valve closing force, which is a resultant force of the fuel pressure and the spring. This may cause the wear in the valve 208 and in the seat portion 213 of the valve seat in FIG. 2. Additionally, the valve 208 may bounce as marked with reference numeral 425 upon the valve closing due to the strong valve closing force.

To perform the control to slow down the valve closing speed of the valve 208, the injection signal 401 adds a pulse signal 421 for controlling the valve closing speed (the valve closing force) upon finishing (turning OFF) of the injection pulse, which is turned ON continuously in an injection duration Ti. At this point in time, the driving current waveform 402 is reduced from a current value for driving the valve 208 to the open side, or from a maintaining current value for retaining the valve opening, to a current value not capable of retaining the valve opening in order to close the valve. In principle, the driving current waveform 402 is reduced to a current value of zero. Subsequently, before the valve 208 is seated, the pulse 421 allows a driving current 422 to flow through the solenoid 214. This permits the solenoid 214 to generate a magnetic force, which is insufficient to be able to restart the valve opening but is sufficient to slow down the valve closing speed, resulting in a change in magnetic force as marked with reference numeral 423 in FIG. 4. Because of the magnetic force 423, the valve displacement 404 changes as marked with reference numeral 424, allowing the valve 208 to seat (the valve closing).

The driving current waveforms 402 and 422 will now be described in detail. The maximum value of a current for the driving current waveform 422 is defined as Ip2, and a duration of the injection pulse 421 (a pulse width) to achieve the current value Ip2 is defined as Ti2. A duration from a time when the injection duration Ti is finished to a time when Ti2 is started is defined as Tc.

A method for setting Ip2 and Ti2 will now be described. Ip2 and Ti2, which are for setting the magnetic force to decide the valve closing force, are changed in a manner dependent on a force affecting the valve closing force. In other words, the force affecting the valve closing force of the fuel injector is affected by the fuel pressure, and thus, Ip2 and Ti2 are changed in a manner dependent on the fuel pressure, thereby changing the magnetic force 423, which is generated by the re-energization of the solenoid 214 for slowing down the valve closing speed, in response to the fuel pressure. Here, Ip2 is increased for a high fuel pressure and reduced for a low fuel pressure. Similarly, Ti2 is prolonged for a high fuel pressure and shortened for a low fuel pressure, thereby adjusting the magnetic force 323 affecting the valve closing force. Upper limit values for Ip2 and Ti2 are decided so as to fall short of a valve opening operation and to be able to retain a sufficient speed to achieve the valve closing.

With the fuel pressure defined as Pf, a force of the spring included in the fuel injector as Psp, the magnetic force generated by allowing the current 322 for controlling the valve closing force to pass through the solenoid as Pi, the valve closing force is equal to the sum of the fuel pressure Pf and the spring force Psp, and the magnetic force Pi needs to be smaller than the valve closing force. In other words, a relationship in expression 1 needs to be satisfied.

$$Pi < Pf + Psp \quad \text{(expression 1)}$$

Ti2 is subjected to a constraint of time period due to the engine rpm and the number of injections. Thus, Ip2 and Ti2 to decide the magnetic force for slowing down the valve closing speed are decided in a manner dependent on the fuel pressure, the engine rpm, and the number of injections.

Setting of Tc will now be described. Tc, which is for deciding a control timing to slow down the valve closing speed, is set after the valve is opened and before it is closed. Thus, Tc is set in accordance with the engine rpm and the injection duration Ti.

Figure 5:
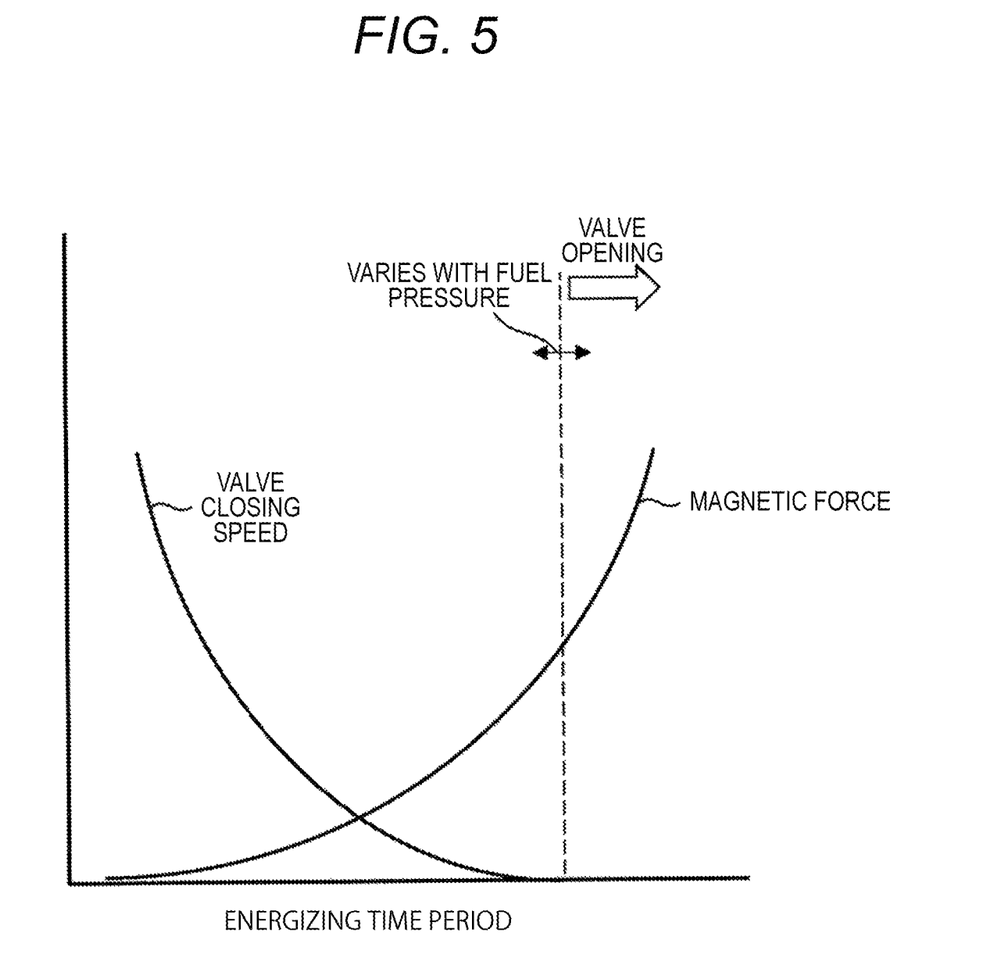
FIG. 5 is a graph of a relationship of a magnetic force and an energizing time period of a valve closing speed.

FIG. 5 is a graph of a relationship of the magnetic force, the valve closing speed, and an energizing time period to energize the solenoid 214, which need to be considered to determine whether to apply the driving current 422 for slowing down the valve closing speed of the fuel injector. In relation to the energizing time period for the solenoid 214 to perform the control for slowing down the valve closing speed, the magnetic force increases as the energizing time period is prolonged, which allows the valve closing speed to slow down as illustrated in FIG. 5. The energizing time period for the driving current 422 needs to be an energizing time period that does not open the valve and that does not make the valve closing speed zero, and furthermore, the energizing time period is decided in a manner dependent on the engine rpm and the number of injections in one stroke (the number of split injections) and depends on an interval between injections. In other words, for a high rpm and a very short control duration for split injections of fuel, a higher priority is given to a pulse for injecting the fuel than a control pulse (421 in FIG. 4) for controlling the valve closing speed (the valve closing force).

With reference to a control flowchart in FIG. 6, a control method through the control for slowing down the valve closing speed of the valve of the fuel injector will now be described.

Figure 6:
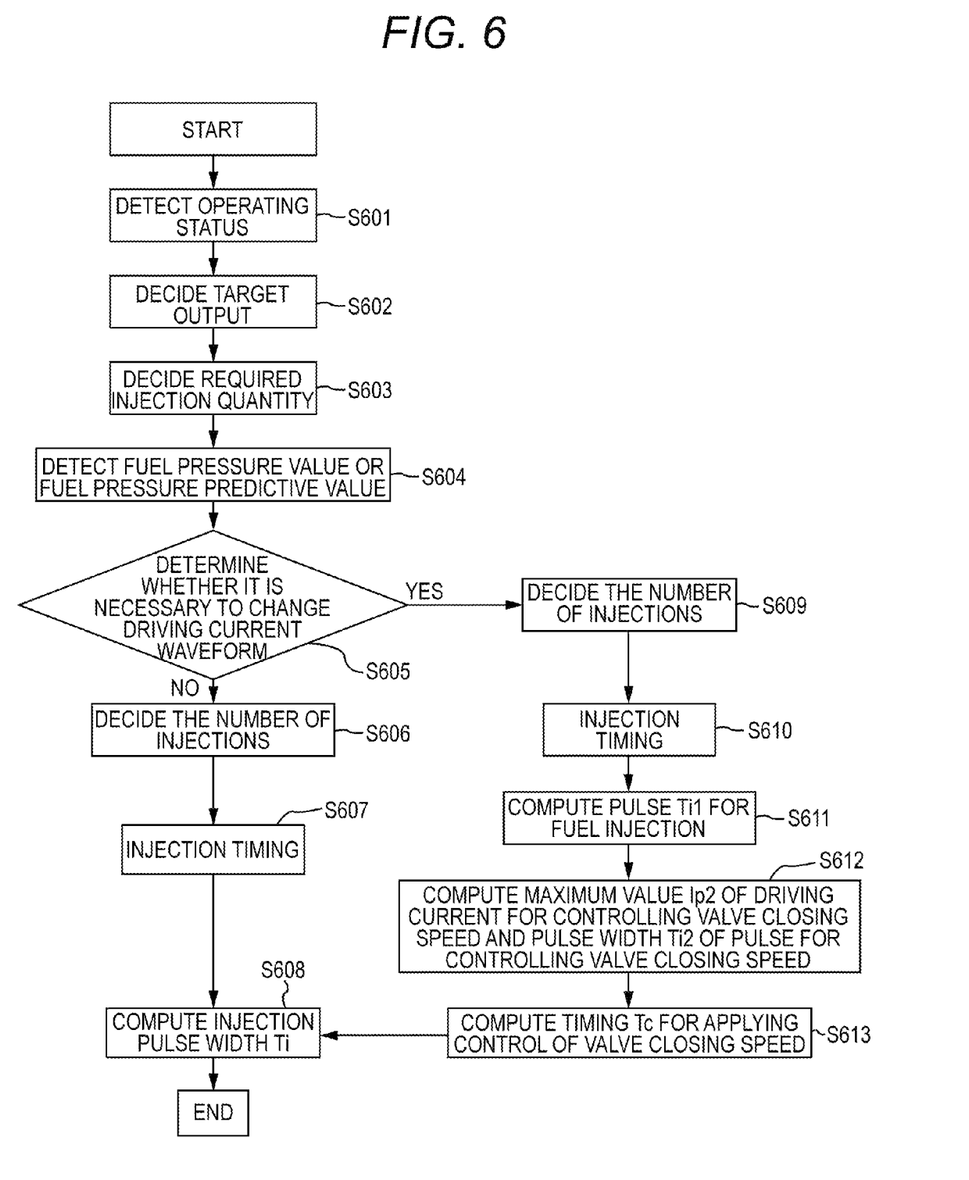
FIG. 6 is a flowchart in a first embodiment.

With reference to FIG. 6, in S601, the operating status is determined upon receipt of outputs from the various sensors described in FIG. 1. Then, in S602, a required output is decided on the basis of the detected operating status. In S603, the ECU 11 computes the injection quantity based on the required output. In S604, the fuel pressure is determined on the basis of an output of the fuel pressure sensor, received by the ECU 11.

To obtain the fuel pressure value, the output value of the pressure sensor 12 may be used, but a predictive value of the fuel pressure decided on the basis of the engine rpm and output may be used. In other words, the fuel pressure value or the equivalent predictive value may be used as a value to determine the switching of the driving waveform.

Then, in S605, if it is determined that it is unnecessary to change the driving current waveform (no), in other words, if the fuel pressure is low, the control to add the driving current 422 to the driving current waveform is not performed. To determine whether the fuel pressure is high or low, a determination value may be set by setting a value decided from a test or the like. By obtaining in advance the relationship between the hardness of the seat portion 213 of the fuel injector 201, the hardness of the needle valve 208, and the valve closing force in accordance with the valve closing speed, a standard value of the fuel pressure can be provided for adding the driving current 422 to the driving current waveform in a manner dependent on a change in valve closing speed (valve closing force) due to the fuel pressure. Note that the determination value for the fuel pressure is set just as a control standard, and that a standard value may be obtained through another method.

If it is unnecessary to change the driving current waveform by adding the driving current 422, follow the procedure from S606 and decide the number of injections and the injection timing of the fuel in one stroke. In S608, the injection pulse width Ti is calculated from the injection quantity requirement, the engine rpm, the driving waveform, the number of injections, the injection timing, and the injection signal is output to the drive circuit 30.

The procedure to be taken if, in S605, it is determined that it is necessary to add the driving current 422 will now be described. In S605, an input of the control of the valve closing speed by adding the driving current 422 to the driving current waveform is selected in accordance with the fuel pressure value or the predictive value of the fuel pressure of S604. Here, the driving current waveform is changed in accordance with the determination value for the fuel pressure described above. In S609, the number of injections is decided with the driving current waveform prior to the change. In S610, the injection timing is decided. In S611, a pulse width Ti1 of an injection pulse is decided. Then in S612, the maximum value Ip2 of the driving current for controlling the valve closing speed and the duration (pulse width) Ti2 of the pulse 421 for generating the driving current value Ip2 are decided in accordance with the number of injections decided in S609, the injection timing decided in S610, and the pulse width Ti1 decided in S611. In S613, the timing Tc for applying the control pulse 421 for controlling the valve closing speed is defined with a reference value of the injection pulse width Ti computed in S611. Then in S608, the injection pulse width Ti is decided to take into consideration an extended portion of the valve opening time period for the added control pulse Ti2 defined in S613. A duration to be reduced from the injection pulse width Ti may be decided with a stored value or an output from the exhaust A/F sensor as reference.

Figure 7:
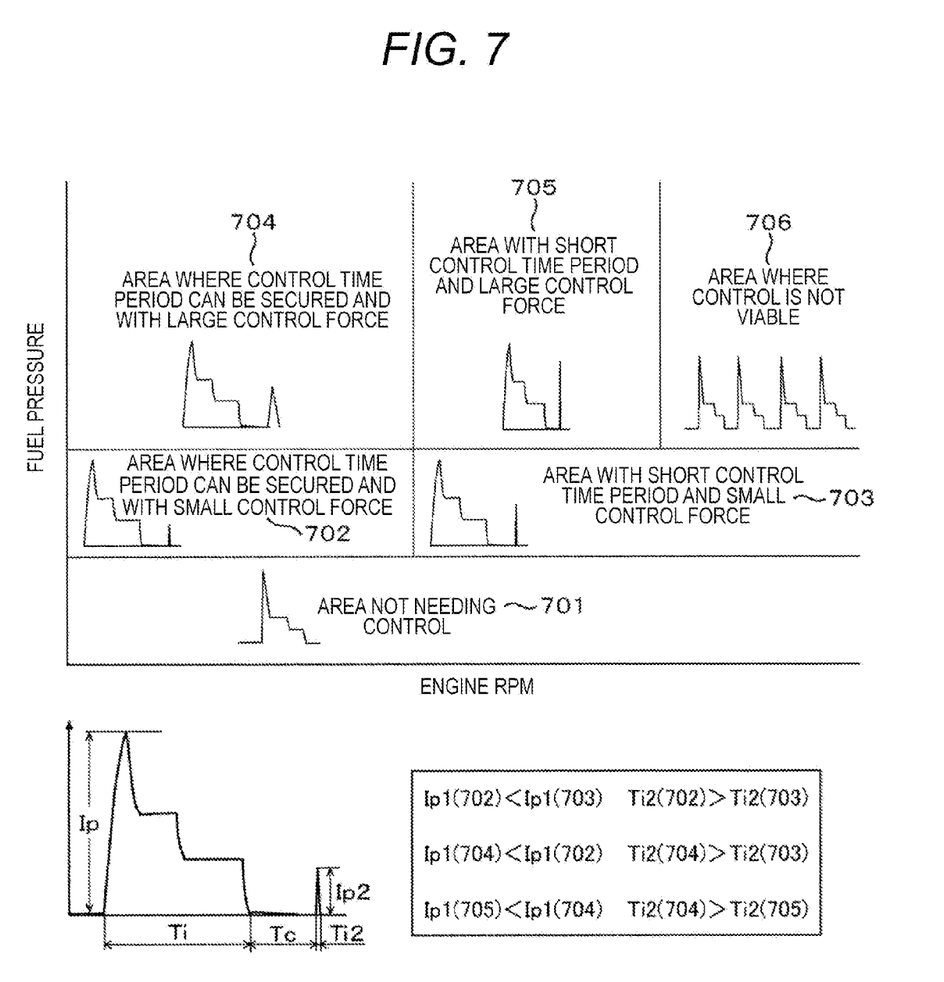
FIG. 7 is a diagram of a relationship of a fuel pressure and a driving waveform in a second embodiment.

A second embodiment according to the invention will now be described with reference to FIGS. 7 and 8. FIG. 7 is a diagram for describing a method for determining control in the second embodiment. A system arrangement and an arrangement of a fuel injector are similar to those in FIG. 1 in principle. In the first embodiment, the driving current waveform is changed by determining the control on the basis of the output from the fuel pressure sensor. In the second embodiment, a map of a fuel pressure and an engine rpm stored in an ECU 11 are used to determine a controllable area through an estimate value of the fuel pressure as illustrated in FIG. 7, so that the control illustrated in FIG. 4 is performed. This allows the control to be performed in a case without a fuel pressure sensor. The map for storing a fuel pressure value may also include an operating state, such as an accelerator opening and a coolant temperature, in addition to the engine rpm.

FIG. 7 will now be described in detail. An area 701 does not need the control due to a low fuel pressure. A fuel pressure that does not need the addition of the driving current 422 may be determined using an area of fuel pressures that does not involve wear and damage and is set on the basis of a test performed in advance. For the determination of the fuel pressure, a threshold is not defined since the fuel pressure varies with component materials for a valve 208 and a seat portion 213 of a valve seat of the fuel injector.

An area 702 will now be described. For a fuel pressure higher than a threshold and a low engine rpm, Ip2 illustrated in FIG. 4 is set smaller than those in areas 703, 704, and 705. A time period for one cycle of an engine is also long, providing a high degree of freedom for setting the pulse width Ti2 of the pulse 421 to generate the driving current 422. Thus, the pulse width Ti2 is set longer than those in the areas 703, 704, and 705.

In the area 703 with a high engine rpm, it is very difficult to secure a time period for controlling the valve closing speed with a limited time period available to generate a magnetic force for controlling the valve closing speed, and thus, a value of the maximum value Ip2 for the driving current is set larger than that in the area 702. The time period Ti2 is set shorter than that in the area 702 because of a short time period up to a following injection.

The area 704 will now be described. In the area with a high fuel pressure and a low engine rpm, a time period needed for controlling the valve closing speed can be secured, and thus a value of Ip2 for the valve closing speed (the valve closing force) can be defined. The value of Ti2 is set longer than that in the area 702 because of the time period is secured with ease.

The area 705 will now be described. In the area 705, because of a high fuel pressure and a high engine rpm therein, it is difficult to secure a sufficient time period for controlling the valve closing speed. Thus, the upper limit values for Ip2 and Ti2 cannot be defined with sufficient magnitudes. Hence, Ti2 is set in a range in which a time period up to the following injection and a magnetic force generated by the driving current 422 have no effect on the following injection. In addition, Ip2 is set in a range in which the valve can be closed.

An area 706 will now be described. In the area 706, because of a high engine rpm, only a brief time period can be secured for performing the control of the valve closing speed. The time period is even shorter than that in the area 705. In other words, there is an area in which the time period for performing the control of the valve closing speed cannot be secured because of a short injection time period, which results in a short time period from the start of the valve closing operation until the valve 208 is seated on the seat portion 213. Thus, in the area 706, the driving current 422 is not allowed to flow through the solenoid 214, and the control to slow down the valve closing speed is not performed.

The relationship between the fuel pressure and the engine rpm in FIG. 7 assumes one injection in one stroke, and thus, the increased number of injections due to split injection further limits controllable areas. In other words, in a case in which only a brief time period can be secured from an injection to an injection, the control is performed only in areas in which a control time period can be secured.

Figure 8:
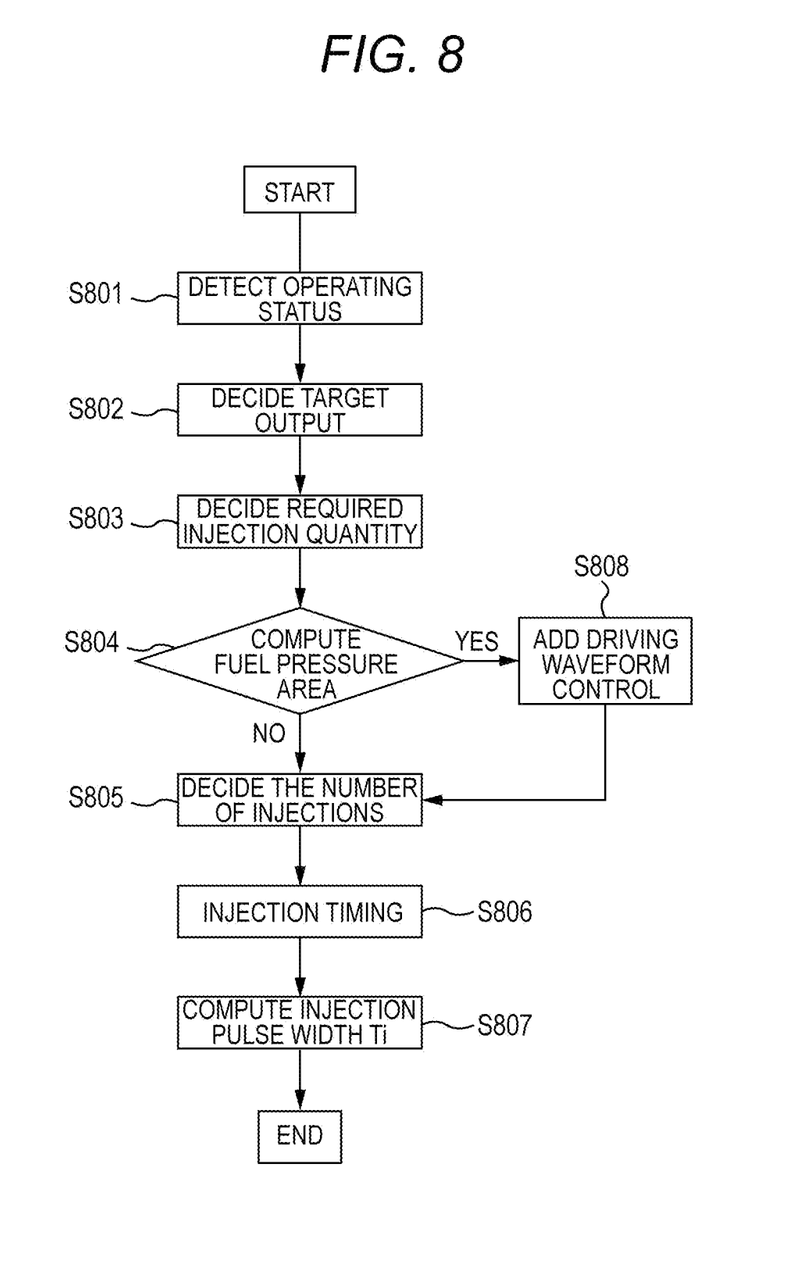
FIG. 8 is a flowchart in the second embodiment.

With reference to FIG. 8, a control procedure in the second embodiment will now be described. In S801, an operating status is detected with outputs of the various sensors received by the ECU 11. Then, in S802, the ECU 11 decides a target output and, in S803, calculates a required injection quantity. In S804, an area is determined in a map of the fuel pressure, as in FIG. 7, by using the detected outputs from the various sensors, for example, outputs from the crank angle sensor, the throttle opening, and the coolant temperature sensor. If it is the area 701 in which the control of the valve closing speed is unnecessary or the area 706 in which the control is not viable, the number of injections, the injection timing, and the injection pulse are computed by following S805, S806, and S807. If an area with a fuel pressure that allows the control of the valve closing speed is determined in S804, then the control to be added is decided (specifically, Ip2, Ti2, and Tc in FIG. 4) and added to the driving current waveform in S808. The number of injections, the injection timing, and the injection pulse are computed in accordance with the changed driving current waveform in S805, S806, and S807.

REFERENCE SIGNS LIST

11 engine control unit (ECU)
12 fuel pressure sensor
201 fuel injector
202 valve body
208 needle valve
210 spring
212 seat member
213 seat portion
214 solenoid
401 injection signal
402 driving current
403 magnetic force
404 valve displacement
421 signal for controlling valve closing force
422 driving current for controlling valve closing force
423 magnetic force for controlling valve closing force
424 valve displacement with valve closing force controlled
S604 step of detecting fuel pressure value or fuel pressure predictive value
S605 step of determining whether it is necessary to change driving current waveform
S612 step of computing maximum value Ip2 of driving current for controlling valve closing speed and pulse width Ti2 of pulse for controlling valve closing speed
S613 step of computing timing Tc for applying control of valve closing speed
701 to 706 control area 1
S804 step of computing fuel pressure area
S808 step of adding control to driving waveform

The invention claimed is:

1. An apparatus, comprising:
    a controller that outputs a first injection pulse that makes a fuel injector inject fuel and a second injection pulse that makes the fuel injector inject fuel, which is to be output subsequently to the first injection pulse, the controller determining whether to output a third pulse in accordance with a measurement value of fuel pressure or a predictive value of the fuel pressure before the second pulse, and if the controller determines to output the third pulse, then the controller controls a driving current that is to be sent to a solenoid of the fuel injector by the third pulse in accordance with the measurement value of the fuel pressure or the predictive value of the fuel pressure, wherein
the third pulse restrains a moving speed of a valve of the fuel injector which moves towards a closed state.

2. The apparatus according to claim 1, wherein
at least one of a maximum value of the driving current that is to be sent to the solenoid by the third pulse and a presence of the driving current that is to be sent to the solenoid by the third pulse is controlled in accordance with the measurement value or the predictive value of the fuel pressure.

3. The apparatus according to claim 2, wherein
the third pulse is changed in accordance with the measurement value or the predictive value of the fuel pressure.

4. The apparatus according to claim 2, wherein
an applying timing of the driving current that is to be sent to the solenoid by the third pulse is controlled in accordance with a driving current waveform for valve opening and closing, an engine rpm, and the number of injections in addition to the measurement value or the predictive value of the fuel pressure.

5. The apparatus according to claim 2, wherein control is performed such that the third pulse is not output in a first operation area having an increased engine rpm and an increased fuel pressure, so that the driving current that is to be sent to the solenoid by the third pulse is prevented from flowing.

6. The apparatus according to claim 5, wherein
the control is performed such that the third pulse is output in a second operation area having an engine rpm similar to the engine rpm in the first operation area and a fuel pressure smaller than the fuel pressure in the first operation area, so that the driving current is sent to the solenoid.

7. The apparatus according to claim 6, wherein
the control is performed such that the third pulse is not output in a third operation area having an engine rpm similar to the engine rpm in the first operation area and the engine rpm in the second operation area and a fuel pressure further smaller than the fuel pressure in the second operation area, so that the driving current that is to be sent to the solenoid by the third pulse is prevented from flowing.

8. The apparatus according to claim 7, wherein,
in a case in which the control is performed for allowing the driving current to be sent to the solenoid by the third pulse, the first injection pulse is reduced in comparison with a case in which the control is not performed.

9. A control system that controls a driving current, comprising:
a fuel injector, the fuel injector having a valve and a solenoid; and
a control apparatus that outputs a first injection pulse that makes the fuel injector inject fuel and a second injection pulse that also makes the fuel injector inject fuel, the second injection pulse being output subsequently to the first injection pulse, the control apparatus also determining whether to output a third pulse in accordance with a measurement value of fuel pressure or a predictive value of the fuel pressure before the second pulse, and if the control apparatus determines to output the third pulse, then the control apparatus controls a driving current that is sent to the solenoid in accordance with the measurement value of the fuel pressure or the predictive value of the fuel pressure, wherein
the third pulse restrains a moving speed of the valve as the valve moves towards a closed state.

10. The system according to claim 9, wherein
at least one of a maximum value of the driving current that is sent to the solenoid and a presence of the driving current that is sent to the solenoid is controlled in accordance with the measurement value or the predictive value of the fuel pressure.

11. The system according to claim 10, wherein
the third pulse is changed in accordance with the measurement value or the predictive value of the fuel pressure.

12. The system according to claim 10, wherein
an applying timing of the driving current that is sent to the solenoid is controlled in accordance with a driving current waveform for valve opening and closing, an engine rpm, and the number of injections in addition to the measurement value or the predictive value of the fuel pressure.

13. The system according to claim 10, wherein control is performed such that the third pulse is not output in a first operation area having an increased engine rpm and an increased fuel pressure, so that the driving current that is sent to the solenoid is prevented from flowing.

14. The system according to claim 13, wherein
the control is performed such that the third pulse is output in a second operation area having an engine rpm similar to the engine rpm in the first operation area and a fuel pressure smaller than the fuel pressure in the first operation area, so that the driving current is sent to the solenoid.

15. The system according to claim 14, wherein
the control is performed such that the third pulse is not output in a third operation area having an engine rpm similar to the engine rpm in the first operation area and the engine rpm in the second operation area and a fuel pressure further smaller than the fuel pressure in the second operation area, so that the driving current that is sent to the solenoid is prevented from flowing.

16. The system according to claim according to claim 15, wherein,
in a case in which the control is performed for sending the driving current to the solenoid, the first injection pulse is reduced in comparison with a case in which the control is not performed.

17. An apparatus for controlling fuel injection, comprising:
a controller that outputs a first injection pulse and a second injection pulse, the first injection pulse and second injection pulse causing injection of an amount of fuel, the second injection pulse being output subsequently to the first injection pulse, the controller also determining whether to output a third pulse in accordance with a measurement value of fuel pressure or a predictive value of the fuel pressure before the second pulse, and when the controller outputs the third pulse the controller also controls a driving current in accordance with the measurement value of the fuel pressure or the predictive value of the fuel pressure, wherein
the third pulse restrains a speed of the injection of the amount of the fuel as the fuel injection moves towards a non-injecting state.

* * * * *